US012683522B2

(12) United States Patent
Winden et al.

(10) Patent No.:    US 12,683,522 B2
(45) Date of Patent:        Jul. 14, 2026

(54) MICROELECTROMECHANICAL ACTUATOR STRUCTURE, COMPONENT

(71) Applicant: Robert Bosch GmbH, Stuttgart (DE)

(72) Inventors: Andreas Winden, Reutlingen (DE); Anton Melnikov, Dresden (DE); Ardeshir Moeinian, Ulm (DE); Peter Engelhart, St. Johann (DE)

(73) Assignee: ROBERT BOSCH GMBH, Stuttgart (DE)

( * ) Notice: Subject to any disclaimer, the term of this patent is extended or adjusted under 35 U.S.C. 154(b) by 232 days.

(21) Appl. No.: 18/734,259

(22) Filed: Jun. 5, 2024

(65) Prior Publication Data

US 2024/0429836 A1     Dec. 26, 2024

(30) Foreign Application Priority Data

Jun. 23, 2023     (DE) ..................... 10 2023 205 958.4

(51) Int. Cl.
| | |
|---|---|
| *H02N 1/00* | (2006.01) |
| *F04B 53/14* | (2006.01) |
| *F16K 99/00* | (2006.01) |
| *H04R 19/02* | (2006.01) |

(52) U.S. Cl.
CPC .............. *H02N 1/006* (2013.01); *F04B 53/14* (2013.01); *F16K 99/0051* (2013.01); *H04R 19/02* (2013.01); *H04R 2201/003* (2013.01)

(58) Field of Classification Search
CPC .......... H01Q 1/2233; H01Q 1/40; H01Q 1/42; H01Q 1/48; H01Q 5/30; H01Q 9/0421; H01Q 9/0471; B81B 2203/04; B81B 3/0021; F04B 43/043; F04B 53/14; F16K 99/0051; H02N 1/004; H02N 1/006; H04R 19/005; H04R 19/02; H04R 2201/003
See application file for complete search history.

(56) References Cited

U.S. PATENT DOCUMENTS

| | | | | |
|---|---|---|---|---|
| 6,190,571 B1 * | 2/2001 | Kato | .................. | G01C 19/5719 |
| | | | | 216/2 |
| 2010/0052469 A1 * | 3/2010 | Naruse | .................. | H02N 1/006 |
| | | | | 310/300 |
| 2018/0297838 A1 * | 10/2018 | Kautzsch | ............ | B81C 1/00246 |

FOREIGN PATENT DOCUMENTS

| | | |
|---|---|---|
| DE | 19756849 A1 | 7/1998 |
| DE | 102017206412 A1 | 10/2018 |
| JP | 2017087348 A | 5/2017 |

* cited by examiner

*Primary Examiner* — Naishadh N Desai
(74) *Attorney, Agent, or Firm* — NORTON ROSE FULBRIGHT US LLP

(57)     ABSTRACT

A microelectromechanical actuator structure including a microelectromechanical chip having a chip frame and a drive structure. The drive structure includes a first drive unit and a second drive unit. The first drive unit includes a first substrate and a first electrode structure. The first substrate has a first doping. The first electrode structure has a doping inverse to the first doping. The second drive unit includes a second substrate having a second doping and a second electrode structure having a doping inverse to the second doping. A pn junction is therefore formed between the substrates and the second electrode structures. The first electrode structure includes at least two first electrodes. The second electrode structure includes at least one second electrode. The first electrodes are arranged flat next to one another in a first electrode plane. The second electrode is arranged flat in a second electrode plane.

10 Claims, 5 Drawing Sheets

MICROELECTROMECHANICAL ACTUATOR STRUCTURE, COMPONENT

CROSS REFERENCE

The present application claims the benefit under 35 U.S.C. § 119 of German Patent Application No. DE 10 2023 205 958.4 filed on Jun. 23, 2023, which is expressly incorporated herein by reference in its entirety.

FIELD

The present invention relates to a microelectromechanical actuator structure and to a component having such a microelectromechanical actuator structure.

BACKGROUND INFORMATION

Microelectromechanical actuator structures are described in the related art and can be used, for example, in loudspeakers, pumps and valves. With these microelectromechanical actuator structures, it is possible to move a useful element. One drive option is a so-called bidirectional electrostatic drive with a displacement capacitor structure. At least two capacitor plates are supplied with a positive and a negative direct voltage, while a capacitor plate offset from them is supplied with a useful signal. The useful signal can be an alternating voltage, for example if the drive is provided for a loudspeaker membrane. The capacitor plates provided for the drive can consist of a semiconductor material and are typically insulated from one another by means of dielectric layers to avoid undesirable potential equalization.

SUMMARY

An object of the present invention is to provide an improved microelectromechanical actuator structure. A further object of the present invention is to provide a component with such a microelectromechanical actuator structure. These objects may be achieved using features of the present invention. Advantageous example embodiments and developments of the present invention are disclosed herein.

According to a first aspect, the present invention relates to a microelectromechanical actuator structure comprising a microelectromechanical chip having a chip frame and a drive structure. According to an example embodiment of the present invention, the drive structure comprises a dopable material. The drive structure comprises a first drive unit and a second drive unit. The first drive unit comprises a first substrate and a first electrode structure. The first substrate has a first doping. The first electrode structure has a doping inverse to the first doping, so that a pn junction is formed between the first substrate and the first electrode structure. The doping of the first electrode structure can be referred to as first inverse doping. The second drive unit comprises a second substrate and a second electrode structure. The second substrate has a second doping. The second electrode structure has a doping inverse to the second doping, so that a pn junction is formed between the second substrate and the second electrode structure. The doping of the second electrode structure can be referred to as second inverse doping. The first electrode structure comprises at least two first electrodes. The second electrode structure comprises at least one second electrode. The first electrodes are arranged flat next to one another in a first electrode plane. The second electrode is arranged flat in a second electrode plane. The first electrode plane and the second electrode plane are substantially parallel. A movement of the second electrode structure relative to the first electrode structure in a movement direction parallel to the electrode planes can be triggered by applying voltages to the electrodes.

In particular, a pn junction can be formed between each of the first electrodes and the first substrate. Because a pn junction is formed between the first electrodes and the first substrate, a dielectric between the first electrodes and the first substrate can be dispensed with. In particular, voltages can be applied to the first electrodes and/or to the first substrate in such a way that the pn junction or the pn junctions are blocking and thus an additional insulating layer can be dispensed with, i.e., the dielectric is not required.

Because a pn junction is also formed between the second electrode and the second substrate, a dielectric between the second electrode and the second substrate can also be dispensed with. In particular, voltages can be applied to the second electrode and/or to the second substrate in such a way that the pn junction is blocking and thus an additional insulating layer can be dispensed with, i.e., the dielectric is not required.

The fact that the electrode planes are substantially parallel can mean that an angle between the first electrode plane and the second electrode plane is less than five degrees, in particular less than two degrees and preferably less than 0.5 degrees. The electrode planes can also be aligned exactly in parallel with one another.

According to an example embodiment of the present invention, an electrode gap of the first electrodes to the second electrode in a direction perpendicular to the first electrode plane and/or perpendicular to the second electrode plane can be a maximum of 3 micrometers, wherein the electrode distance can depend on the intended use of the microelectromechanical actuator structure. The electrode gap can be in the range of 0.1 micrometers, i.e., 100 nanometers to 1.5 micrometers. For use in a loudspeaker, the upper part of this range, for example between 1 micrometer and 1.5 micrometers, can be provided, while other applications can better be provided in the lower part of this range.

According to an example embodiment of the present invention, more than one second electrode is arranged in the second drive unit, wherein all second electrodes are located in the second electrode plane. In this case, all second electrodes have the doping that is inverse to the second doping and thus a pn junction is arranged between all second electrodes and the second substrate.

According to an example embodiment of the present invention, the first substrate and the first electrodes may consist of a semiconductor material, wherein the first substrate and the first electrodes are inversely doped to one another. The second substrate and the second electrodes may consist of a semiconductor material, in particular the same semiconductor material, wherein the second substrate and the second electrodes are also doped inversely to one another. This results in a simple design of the microelectromechanical actuator structure. The electrodes can be produced in particular by introducing local doping.

According to an example embodiment of the present invention, the semiconductor material can be silicon. The locally introduced doping creates a change in conductivity in the semiconductor material/silicon in some regions. In some regions means both laterally parallel to the electrode planes and variable in depth. This can be achieved laterally via mask technology and in depth also via a suitable selection of doping elements, via ion energy when using implantation technology, via outdiffusion under temperature treatment or via additional semiconductor material layer deposition. The change in conductivity of the semiconductor material refers, in addition to the conductivity itself (in the sense of ohmic specific conductivity), in particular to the variation and differentiation of the semiconductor type. N-type and p-type semiconductor materials differ by the majority charge carriers responsible for the conductivity, wherein in the n-type the electron concentration determines the conductivity and in the p-type the hole concentration determines it. In addition to the electrodes that form structures for planar displacement capacitor structures, their potential supply lines can also be generated analogously, wherein the characteristics of pn junctions are also utilized for the potential supply lines. By appropriately triggering the potential of the sub-regions of the actuator structure, the pn junctions are used for the functionality either conductively in the forward direction (potential conduction) or blockingly in the reverse direction (potential isolation).

If silicon is provided as the semiconductor material, arsenic, phosphorus and antimony can be used as donors for the n-doping and boron, aluminum and indium can be used as donors for the p-doping.

According to an example embodiment of the present invention, the first substrate can be adjacent to the first electrode structure. The second substrate can alternatively or additionally adjoin the second electrode structure.

According to a second aspect, the present invention relates to a component having such a microelectromechanical actuator structure. The component further comprises a useful element, wherein the useful element can be driven by the drive structure.

The microelectromechanical actuator structure according to the present invention enables the useful element to be moved, in particular in parallel with the electrode planes.

In one example embodiment of the component of the present invention, the useful element is a loudspeaker membrane or a pump piston or a valve membrane. In particular for loudspeakers, pumps or valves, the microelectromechanical actuator structure can be well used to provide microelectromechanical loudspeakers, pumps or valves.

The example embodiments of the micromechanical actuator structure of the present invention described below can also be used in the described components.

In one example embodiment of the microelectromechanical actuator structure of the present invention, at least one trench is arranged between the first electrodes. A trench width here can be in the order of magnitude of the electrode gap. In particular, the trench width can be a maximum of 2 micrometers or preferably a maximum of 1 micrometer. The trench width can extend in parallel with the electrode planes. A trench depth can be a maximum of 6 micrometers or in particular a maximum of 3 micrometers or preferably a maximum of 1 micrometer. Such a trench is not arranged between all the first electrodes, but only between some of the first electrodes. However, the trench may also be arranged between all of the first electrodes. Such a trench may also be arranged between the second electrodes if more than one second electrode is provided. This trench can also have the properties already described. The trenches make it possible to keep the distance between the electrodes small. If semiconductor material instead of the trenches were arranged there, a space charge zone could form there, which could lead to undesired contact between the electrodes and thus to a functional impairment.

In one example embodiment of the microelectromechanical actuator structure of the present invention, the first drive unit is immobile relative to the chip frame. The second drive unit is joined to the chip frame by means of spring elements. Thus, the second drive unit moves while the first drive unit remains stationary.

In one example embodiment of the microelectromechanical actuator structure of the present invention, the first substrate has a p-doping. The first doping is therefore a p-doping. The first electrode structure has an n-doping. The first inverse doping is therefore an n-doping. The second substrate has a p-doping. The second doping is therefore a p-doping. The second electrode structure has an n-doping. The second inverse doping is therefore an n-doping.

In one example embodiment of the microelectromechanical actuator structure of the present invention, the first substrate has an n-doping. The first doping is therefore an n-doping. The first electrode structure has a p-doping. The first inverse doping is therefore a p-doping. The second substrate has an n-doping. The second doping is therefore an n-doping. The second electrode structure has a p-doping. The second inverse doping is therefore a p-doping.

In one example embodiment of the microelectromechanical actuator structure of the present invention, the first substrate has a p-doping. The first doping is therefore a p-doping. The first electrode structure has an n-doping. The first inverse doping is therefore an n-doping. The second substrate has an n-doping. The second doping is therefore an n-doping. The second electrode structure has a p-doping. The second inverse doping is therefore a p-doping.

In one example embodiment of the microelectromechanical actuator structure of the present invention, the first substrate has an n-doping. The first doping is therefore an n-doping. The first electrode structure has a p-doping. The first inverse doping is therefore a p-doping. The second substrate has a p-doping. The second doping is therefore a p-doping. The second electrode structure has an n-doping. The second inverse doping is therefore an n-doping.

In one example embodiment of the microelectromechanical actuator structure of the present invention, the first substrate has a doping concentration of $1*10^{18}$ or less, preferably $1*10^{17}$ or less and in particular $1*10^{16}$ or less doping atoms per cubic centimeter.

In one example embodiment of the microelectromechanical actuator structure of the present invention, the second substrate has a doping concentration of $1*10^{18}$ or less, preferably $1*10^{17}$ or less and in particular $1*10^{16}$ or less doping atoms per cubic centimeter.

In one example embodiment of the microelectromechanical actuator structure of the present invention, the first electrode structure has a doping concentration of $5*10^{18}$ or more, preferably $5*10^{19}$ or more and in particular $5*10^{20}$ or more doping atoms per cubic centimeter.

In one example embodiment of the microelectromechanical actuator structure of the present invention, the second electrode structure has a doping concentration of $5*10^{18}$ or more, preferably $5*10^{19}$ or more and in particular $5*10^{20}$ or more doping atoms per cubic centimeter.

In one example embodiment of the microelectromechanical actuator structure of the present invention, the first drive unit comprises a further first substrate. The further first substrate is doped inversely to the first substrate. The further first substrate adjoins the first substrate, so that the first electrodes, the first substrate and the further first substrate each form an npn or a pnp layer sequence (corresponding to a transistor structure). In this case, the further first substrate can be provided with a potential independently of the first substrate, so that a potential difference can be provided between the chip frame and the first substrate.

In one example embodiment of the microelectromechanical actuator structure of the present invention, the second drive unit comprises a further second substrate. The further second substrate is doped inversely to the second substrate. The further second substrate adjoins the second substrate, so that the second electrodes, the second substrate and the further second substrate each form an npn or a pnp layer sequence (corresponding to a transistor structure). In this case, the further second substrate can be provided with a potential independently of the second substrate, so that a potential difference can be provided between the chip frame and the second substrate.

In one example embodiment of the microelectromechanical actuator structure of the present invention, the first substrate and the further first substrate each form a layer of the first drive unit. In one embodiment, the second substrate and the further second substrate each form a layer of the second drive unit.

In one example embodiment of the microelectromechanical actuator structure of the present invention, the second electrode structure comprises more than one second electrode. An intermediate recess or substrate region is arranged between the second electrodes. A width of the intermediate recess or the substrate region is larger than a width of the second electrodes. A depth of the intermediate recess or the substrate region is deeper than the second electrodes. The depth of the intermediate recess or the substrate region can in particular be a multiple of the electrode gap. In particular, the depth of the intermediate recess or the substrate region can be up to 10 times the electrode gap or correspond to the depth of the trenches already described.

In one example embodiment of the microelectromechanical actuator structure of the present invention, the drive structure comprises a third drive unit and a fourth drive unit. The third drive unit comprises a third substrate and a third electrode structure. The third substrate has a third doping. The third electrode structure has a doping inverse to the third doping, so that a pn junction is formed between the third substrate and the third electrode structure. The fourth drive unit comprises a fourth substrate and a fourth electrode structure. The fourth substrate has a fourth doping. The fourth electrode structure has a doping inverse to the fourth doping, so that a pn junction is formed between the fourth substrate and the fourth electrode structure. The third electrode structure comprises at least two third electrodes. The fourth electrode structure comprises at least one fourth electrode. The third electrodes are arranged flat next to one another in a third electrode plane. The fourth electrode is arranged flat in a fourth electrode plane. The third electrode plane and the fourth electrode plane are substantially parallel. The fourth substrate is mechanically joined to the second substrate. The first substrate is mechanically joined to the third substrate. The third drive unit can therefore have the same structure as the first drive unit. All other features of the first drive unit can optionally also be provided for the third drive unit. The fourth drive unit can therefore have the same structure as the second drive unit. All other features of the second drive unit can optionally also be provided for the fourth drive unit, In one example embodiment of the microelectromechanical actuator structure of the present invention, the first electrode structure and/or the second electrode structure has a gate electrode. A deflection of the drive structure can be determined by means of the gate electrode. This allows the triggering of the electrodes to be controlled and/or regulated on the basis of the deflection.

In one example embodiment of the microelectromechanical actuator structure of the present invention, it further comprises a control unit, which can be designed as an ASIC or as another computing unit. The control unit is designed to apply voltages to the electrodes. Alternatively, the control unit is assigned to the component and not to the microelectromechanical actuator structure.

Exemplary embodiments of the present invention are explained with reference to the figures.

DETAILED DESCRIPTION OF EXAMPLE EMBODIMENTS

In the following description of the figures, the same reference symbols may be used for elements and features with the same effect. In particular, the features disclosed in connection with the figures may, if appropriate, also be provided individually in special embodiments.

Figure 1:
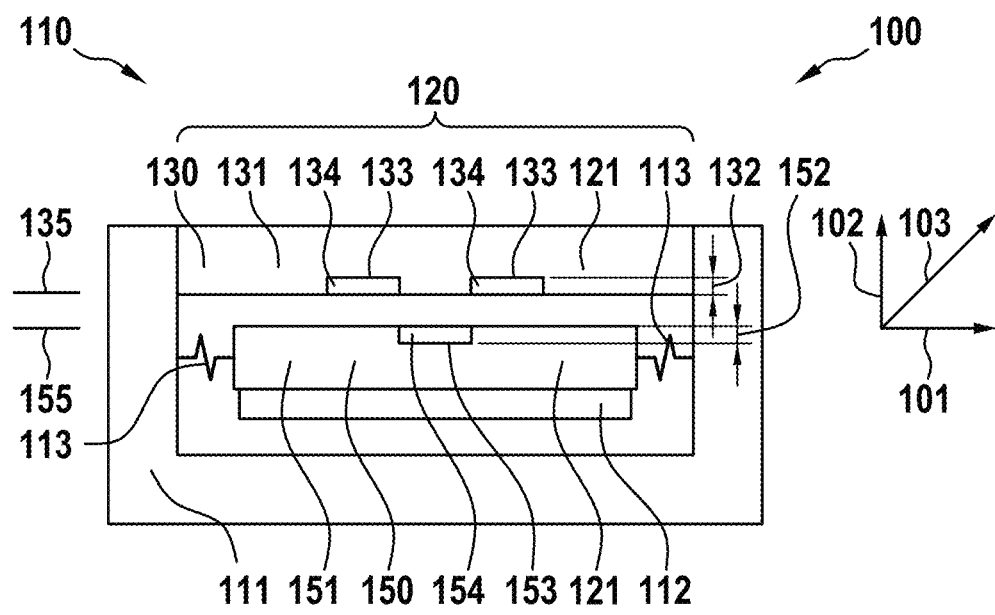
FIG. 1 shows a cross section of a microelectromechanical actuator structure, according to an example embodiment of the present invention.

FIG. 1 shows a cross section of a microelectromechanical actuator structure 100. Furthermore, a coordinate system is shown, which has a first extension direction 101, a second extension direction 102 perpendicular thereto and a third extension direction 103 perpendicular to the first extension direction 101 and the second extension direction 102. The first extension direction 101 and the second extension direction 102 represent the drawing plane of FIG. 1; the third extension direction 103 extends into the drawing plane. The micromechanical actuator structure 100 comprises a microelectromechanical chip 110 having a chip frame 111 and a drive structure 120. The drive structure 120 comprises a dopable material 121. The printed circuit board 120 comprises a first drive unit 130 and a second drive unit 150. The first drive unit 130 comprises a first substrate 131 and a first electrode structure 132. The first substrate 131 has a first doping. The first electrode structure 132 has a doping inverse to the first doping, so that a first pn junction 133 is formed between the first substrate 131 and the first electrode structure 132. The doping of the first electrode structure 132 can be referred to as first inverse doping. The second drive unit 150 comprises a second substrate 151 and a second electrode structure 152. The second substrate has a second doping. The second electrode structure 152 has a doping inverse to the second doping, so that a second pn junction 153 is formed between the second substrate 151 and the second electrode structure 152. The doping of the second electrode structure 152 can be referred to as second inverse doping. The first electrode structure 132 comprises at least two first electrodes 134. The second electrode structure 152 comprises at least a second electrode 154. The first electrodes 134 are arranged flat next to one another in a first electrode plane 135. The second electrode 154 is arranged flat in a second electrode plane 155. The first electrode plane 135 and the second electrode plane 155 are substantially parallel. A movement of the second electrode structure 152 relative to the first electrode structure 132 in a direction of movement parallel to the electrode planes 135, 155 can be triggered by applying voltages to the electrodes 134, 154.

The movement of the second electrode structure 152 relative to the first electrode structure 132 can in particular include a movement of the second substrate 151 including the second electrodes 152 in the first extension direction 101. Optionally, a functional element 112 can be arranged on the second substrate 151. The microelectromechanical actuator structure 100 can be configured to drive the functional element 112.

In particular, a first pn junction 133 can be formed between each of the first electrodes 134 and the first substrate 131, as optionally shown in FIG. 1. Because a first pn junction 133 is formed between the first electrodes 134 and the first substrate 131, a dielectric between the first electrodes 134 and the first substrate 131 can be dispensed with. In particular, voltages can be applied to the first electrodes 134 and/or to the first substrate 131 such that the first pn junction 133 or the first pn junctions 133 are blocking, and thus an additional insulating layer can be dispensed with, i.e., the dielectric is not required.

Because a second pn junction 153 is formed between the second electrode 154 and the second substrate 151, a dielectric between the second electrode 154 and the second substrate 151 can also be dispensed with. In particular, voltages can be applied to the second electrode 154 and/or to the second substrate 151 such that the second pn junction 153 is blocking and thus an additional insulating layer can be dispensed with, i.e., the dielectric is not required.

The fact that the electrode planes 135, 155 are substantially parallel can mean that an angle between the first electrode plane 135 and the second electrode plane 155 is a maximum of five degrees, in particular a maximum of two degrees and preferably a maximum of 0.5 degrees. The electrode planes 135, 155 can also be aligned exactly in parallel with one another, as shown by way of example in FIG. 1.

An electrode gap between the first electrodes 134 and the second electrode 154 in a direction perpendicular to the first electrode plane 135 and/or perpendicular to the second electrode plane 155 can be a maximum of 3 micrometers. The electrode gap can be defined in the second extension direction 102, for example perpendicular to the movement in the first extension direction. The electrode gap may depend on the intended use of the microelectromechanical actuator structure 100. The electrode gap can be in the range of 0.1 micrometer, i.e., 100 nanometers, to 1.5 micrometers. For use in a loudspeaker, the upper part of this range, for example between 1 micrometer and 1.5 micrometers, can be provided, while other applications can better be provided in the lower part of this range.

The first substrate 131 and the first electrodes 134 can consist of a semiconductor material, wherein the first substrate 131 and the first electrodes 134 are doped inversely to one another. The second substrate 151 and the second electrodes 154 can consist of a semiconductor material, in particular the same semiconductor material, wherein the second substrate 151 and the second electrodes 154 are also doped inversely to one another.

This results in a simple construction of the microelectromechanical actuator structure 100. The electrodes 134, 154 can be produced in particular by means of the introduction of local doping.

The semiconductor material can be silicon. The locally introduced doping creates a change in conductivity in the semiconductor material/silicon in some regions. In some regions means both laterally parallel to the electrode planes 135, 155, and variable in depth. Parallel to the electrode planes 135, 155 can mean in the first extension direction 101 and in the third extension direction 103, while the depth is defined in the second extension direction 102. This can be achieved laterally via mask technology and in depth also via a suitable selection of doping elements, via ion energy when using implantation technology, via outdiffusion under temperature treatment or via additional semiconductor material layer deposition. The change in conductivity of the semiconductor material refers, in addition to the conductivity itself (in the sense of ohmic specific conductivity), in particular to the variation and differentiation of the semiconductor type. N-type and p-type semiconductor materials differ by the majority charge carriers responsible for the conductivity, wherein in the n-type the electron concentration determines the conductivity and in the p-type the hole concentration determines it. In addition to the electrodes that form structures for planar displacement capacitor structures, their potential supply lines can also be generated analogously, wherein the characteristics of pn junctions are also utilized for the potential supply lines. By appropriately triggering the potential of the sub-regions of the actuator structure, the pn junctions are used for the functionality either conductively in the forward direction (potential conduction) or blockingly in the reverse direction (potential isolation).

If silicon is provided as the semiconductor material, arsenic, phosphorus or antimony can be used as donors for the n-doping and boron, aluminum or indium can be used for the p-doping.

The first substrate 131 can be adjacent to the first electrode structure 132, as shown in FIG. 1. The second substrate 151 may alternatively or additionally adjoin the second electrode structure 152, as also shown in FIG. 1.

The microelectromechanical actuator structure 100 shown in FIG. 1 can in particular be controlled in such a way that a direct voltage is applied to the first electrodes 134, wherein one of the first electrodes 134 is at a positive potential and a first electrode 134 arranged next to it is at a negative potential.

The second electrode 154 is supplied with an alternating voltage or a variable/controllable direct voltage, wherein a potential of the second electrode 154 defines a deflection of the second drive unit 150. Furthermore, also applying a potential to the chip frame 111 can be provided.

In the following, exemplary embodiments of the present invention are described, which can each optionally be provided individually or in combination for the microelectro-mechanical actuator structure 100 of FIG. 1.

In one exemplary embodiment of the microelectrome-chanical actuator structure 100, the first drive unit 130 is immobile relative to the chip frame 111, as shown in FIG. 1. The second drive unit 150 is joined to the chip frame 111 by means of spring elements 113. Thus, the second drive unit 150 moves while the first drive unit 130 remains stationary.

In one exemplary embodiment of the microelectrome-chanical actuator structure 100, the first substrate 131 has a p-doping. The first doping is therefore a p-doping. The first electrode structure 132 has an n-doping. The first inverse doping is therefore an n-doping. The second substrate 151 has a p-doping. The second doping is therefore a p-doping. The second electrode structure 152 has an n-doping. The second inverse doping is therefore an n-doping.

In one exemplary embodiment of the microelectrome-chanical actuator structure 100, the first substrate 131 has an n-doping. The first doping is therefore an n-doping. The first electrode structure 132 has a p-doping. The first inverse doping is therefore a p-doping. The second substrate 151 has an n-doping. The second doping is therefore an n-doping. The second electrode structure 152 has a p-doping. The second inverse doping is therefore a p-doping.

In one exemplary embodiment of the microelectrome-chanical actuator structure 100, the first substrate 131 has a p-doping. The first doping is therefore a p-doping. The first electrode structure 132 has an n-doping. The first inverse doping is therefore an n-doping. The second substrate 151 has an n-doping. The second doping is therefore an n-doping. The second electrode structure 152 has a p-doping. The second inverse doping is therefore a p-doping.

In one exemplary embodiment of the microelectrome-chanical actuator structure 100, the first substrate 131 has an n-doping. The first doping is therefore an n-doping. The first electrode structure 132 has a p-doping. The first inverse doping is therefore a p-doping. The second substrate 151 has a p-doping. The second doping is therefore a p-doping. The second electrode structure 152 has an n-doping. The second inverse doping is therefore an n-doping.

In one exemplary embodiment of the microelectrome-chanical actuator structure 100, the first substrate 131 has a doping concentration of $1*10^{\wedge}18$ or less, preferably $1*10^{\wedge}17$ or less and in particular $1*10^{\wedge}16$ or less doping atoms per cubic centimeter.

In one exemplary embodiment of the microelectrome-chanical actuator structure 100, the second substrate 151 has a doping concentration of $1*10^{\wedge}18$ or less, preferably $1*10^{\wedge}17$ or less and in particular $1*10^{\wedge}16$ or less doping atoms per cubic centimeter.

In one exemplary embodiment of the microelectrome-chanical actuator structure 100, the first electrode structure 132 has a doping concentration of $5*10^{\wedge}18$ or more, preferably $5*10^{\wedge}19$ or more and in particular $5*10^{\wedge}20$ or more doping atoms per cubic centimeter.

In one exemplary embodiment of the microelectrome-chanical actuator structure 100, the second electrode struc-ture 152 has a doping concentration of $5*10^{\wedge}18$ or more, preferably $5*10^{\wedge}19$ or more and in particular $5*10^{\wedge}20$ or more doping atoms per cubic centimeter.

A space charge zone is formed at the first pn junctions 133 and at the second pn junction 153, respectively. The space charge zone extends at both sides, i.e., into the electrode structures 132, 152 and also into the substrates 131, 151. The width of the two space charge zone regions is determined by the respective doping concentrations of electrode structures 132, 152 and substrates 131, 151. By appropriately triggering the electrical potential, this pn junction blocks, so that different potentials can be set in regions having different doping with low losses. Low loss can mean that only a small blocking saturation current flows across the pn junction (due to thermally generated minority charge carriers in the respective n- and p-doped regions), thereby achieving a low power loss to maintain the potential differences. This prop-erty can be called insulation of the pn junction.

If, for example, the first substrate 131 is p-doped and the first electrode structure 132 is n-doped and a direct voltage of +30 volts or –30 volts is to be applied to the first electrodes 134, the first substrate 131 can be subjected to a potential of less than –30 volts, i.e., in particular a negative direct voltage with a magnitude of more than 30 volts, so that all the first pn junctions 133 are blocking. If, for example, the second substrate 151 is p-doped and the second electrode structure 152 is n-doped and a DC voltage that is variable within a range is to be applied to the second electrode, the second substrate 151 can in particular be subjected to a potential smaller than the smallest possible DC voltage so that the second pn junctions 153 are also blocking. If the second electrode 154 is to be subjected to an alternating voltage, the potential applied to the second substrate 151 can be greater in magnitude than an amplitude of the alternating voltage and can be negative so that the second pn junctions 153 are also blocking. If the doping is reversed, a potential greater than the maximum possible voltage applied to the electrodes 134, 154 can be applied to the substrates 131, 151 analogously so that the pn junctions 133, 153 are blocking.

Figure 2:
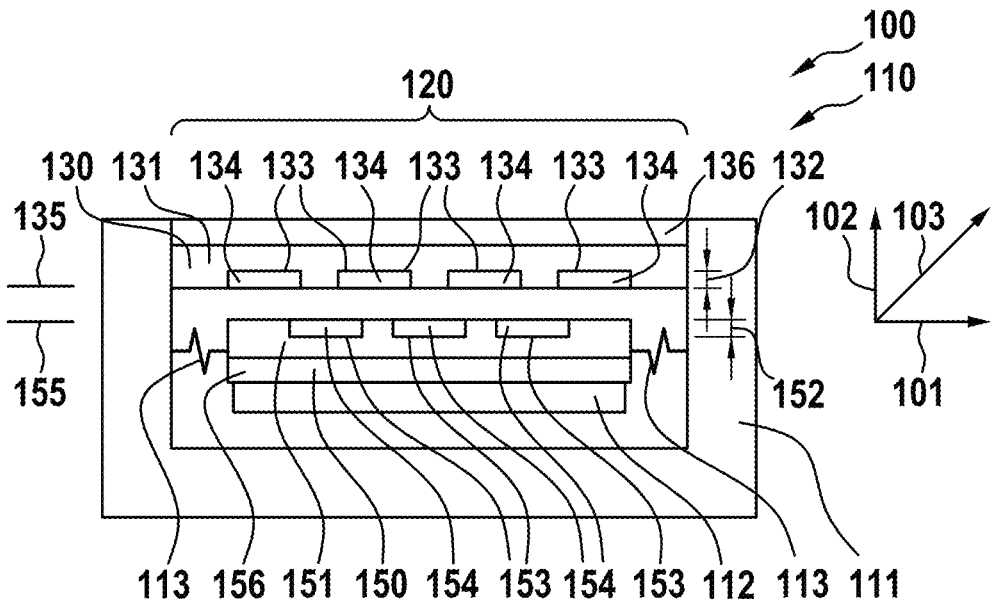
FIG. 2 shows a cross section of a further microelectromechanical actuator structure, according to an example embodiment of the present invention.

FIG. 2 shows a cross section of a microelectromechanical actuator structure 100, which corresponds to the microelec-tromechanical actuator structure 100 of FIG. 1, unless differences are described below.

More than one second electrode 154 is arranged in the second electrode structure 152. All second electrodes 154 are located in the second electrode plane 155. In this case, all second electrodes 154 have the doping inverse to the second substrate 151 and thus a second pn junction 153 is arranged between all second electrodes 154 and the second substrate 151.

In one exemplary embodiment of the microelectrome-chanical actuator structure 100, the first drive unit 130 comprises a further first substrate 136. The further first substrate 136 is doped inversely to the first substrate 131. The further first substrate 136 adjoins the first substrate 131, so that the first electrodes 134, the first substrate 131 and the further first substrate 136 each form an npn or a pnp layer sequence (corresponding to a transistor structure). In this case, the further first substrate 136 can be provided with a potential independently of the first substrate 131, so that a potential difference can be provided between the chip frame 111 and the first substrate 131. This embodiment shown in FIG. 2 can also be provided in the microelectromechanical actuator structure 100 of FIG. 1.

In one exemplary embodiment of the microelectrome-chanical actuator structure 100, the second drive unit 150 comprises a further second substrate 156. The further second substrate 156 is doped inversely to the second substrate 151. The further second substrate 156 adjoins the second sub-strate 151, so that the second electrodes 154, the second substrate 151 and the further second substrate 156 each form an npn or a pnp layer sequence (corresponding to a transistor structure). In this case, the further second substrate 156 can be provided with a potential independently of the second substrate 151, so that a potential difference can be provided between the chip frame 111 and the second substrate 151.

This embodiment shown in FIG. 2 can also be provided in the microelectromechanical actuator structure 100 of FIG. 1.

In one exemplary embodiment of the microelectromechanical actuator structure, the first substrate 131 and the further first substrate 136 each form a layer of the first drive unit 130. In one exemplary embodiment, the second substrate 151 and the further second substrate 156 each form a layer of the second drive unit 150. This is also shown in FIG. 2.

With the exemplary embodiment of the microelectromechanical actuator structure shown in FIG. 2, an advantageous triggering of the electrodes 134, 154 is possible due to the pnp or npn layer structures present in both drive units 130, 150, which can act as pnp or npn transistor structures. In particular, the further first substrate 136 or the further second substrate 156 in this embodiment can each be placed at a potential identical to that of the chip frame without influencing the blocking pn junctions 133, 153.

Figure 3:
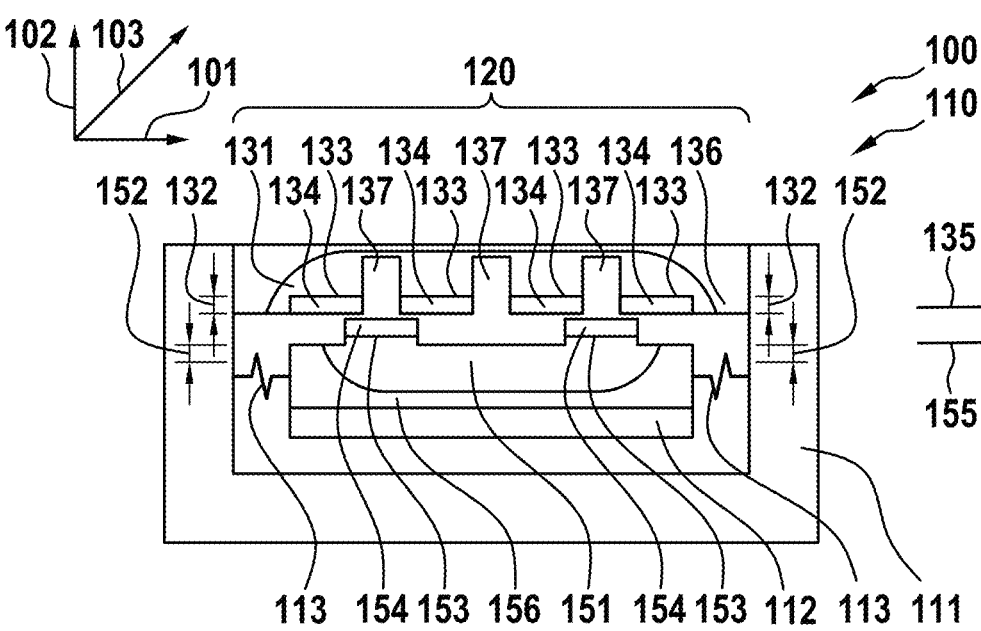
FIG. 3 shows a cross section of a further microelectromechanical actuator structure, according to an example embodiment of the present invention.

FIG. 3 shows a cross section of a microelectromechanical actuator structure 100, which corresponds to the microelectromechanical actuator structure 100 of FIG. 2, unless differences are described below. In particular, the second drive unit 150 comprises more than one second electrode 154. The first drive unit 130 comprises the further first substrate 136, the second drive unit 150 comprises the further second substrate 156. In this exemplary embodiment, the further substrates 136, 156 are not designed as a layer, but as a doping well. Such a configuration is also possible in the exemplary embodiments of FIGS. 1 and 2. In the exemplary embodiment of FIG. 3, the design of the further substrates 136, 156 can alternatively be provided as layers analogous to FIG. 2.

In one exemplary embodiment of the microelectromechanical actuator structure 100, as optionally shown in FIG. 3, at least one trench 137 is arranged between the first electrodes 134. In FIG. 3, trenches 137 are shown between all first electrodes 134. A trench width here can be in the order of magnitude of the electrode gap. In particular, the trench width can be a maximum of 2 micrometers or preferably a maximum of 1 micrometer. The trench width can extend in parallel with the electrode planes 135, 155, i.e., in the first extension direction 101. A trench depth can be a maximum of 6 micrometers or in particular a maximum of 3 micrometers or preferably a maximum of 1 micrometer. The trench depth can be defined in particular in the second extension direction 102. It can be provided that such a trench 137 is not arranged between all of the first electrodes 134, but only between some of the first electrodes 134. However, the trench 137 can also be arranged between all of the first electrodes 134. By means of the trenches 137, it is possible to keep a spacing of the first electrodes 134 small, in particular in the first extension direction 101. If semiconductor material were arranged there instead of the trenches 137, a space charge zone could form therein, which could lead to undesired contact between the first electrodes 134 and thus to a functional impairment. This can be prevented or at least avoided by the trenches.

Such a trench may also be arranged between the second electrodes 154 if more than one second electrode 154 is provided. This trench can also have the properties already described. Such trenches are not shown in FIG. 3, because an alternative embodiment is to be described in FIG. 3 with respect to the second drive unit 150.

In one exemplary embodiment of the microelectromechanical actuator structure 100, the second electrode structure 152 comprises more than one second electrode 154, as also shown in FIG. 3. An intermediate recess 157 is arranged between the second electrodes 154. Instead of the intermediate recess 157, a substrate region without second electrodes 154 can also be provided. A width of the intermediate recess 157 or of the substrate region is greater than a width of the second electrodes 154, in particular as relates to the second extension direction 102. A depth of the intermediate recess 157 or of the substrate region is deeper than the second electrodes 154, in particular as relates to the second extension direction 102. The depth of the intermediate recess 157 or of the substrate region can in particular be a multiple of the electrode gap. In particular, the depth of the intermediate recess 157 or the substrate region can be up to 10 times the electrode gap or correspond to the already described depth of the trenches 137.

The trenches 137 explained in connection with FIG. 3 can also be provided in the embodiments of FIGS. 1 and 2. The intermediate recesses 157 explained in connection with FIG. 3 can also be provided in the embodiments of FIG. 2.

The electrodes 134, 154, substrates 131, 151 and further substrates 136, 156 shown in FIGS. 1 to 3 can be contacted in particular by means of doped semiconductor structures in order to be able to apply the voltages and potentials described above. The contacting of the second drive unit 150 can be carried out in particular via the spring elements 113.

Figure 4:
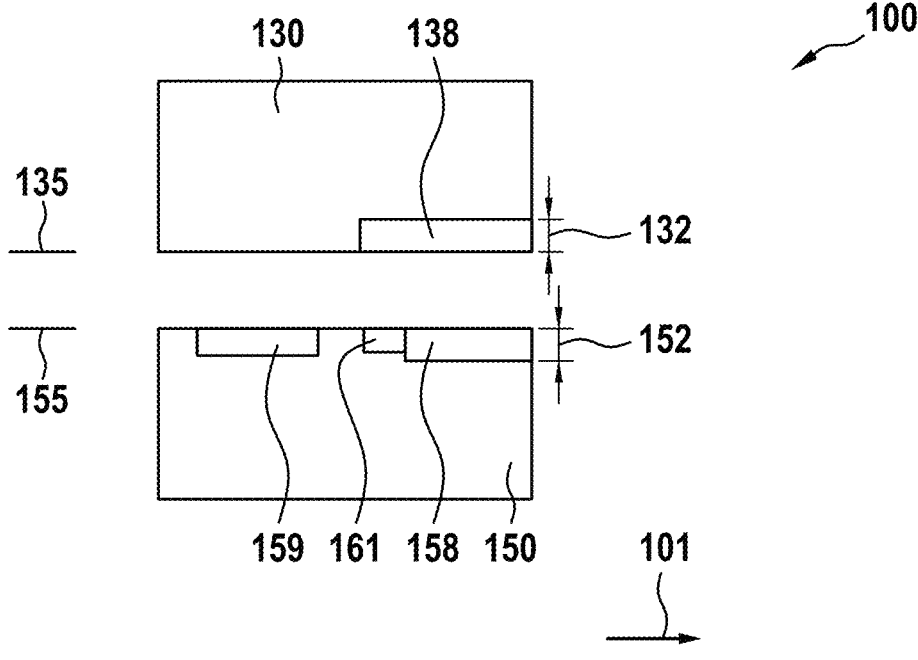
FIG. 4 shows a cross section of a detail of a further microelectromechanical actuator structure, according to an example embodiment of the present invention.

FIG. 4 shows a cross section of a detail of a further microelectromechanical actuator structure 100. The first electrode structure 132 comprises a gate electrode 138. A deflection of the drive structure 120 can be determined by means of the gate electrode 138. For this purpose, the second electrode structure 152, as also shown in FIG. 4, can comprise a first detection electrode 158 and a second detection electrode 159. The gate electrode 138 overlaps the first detection electrode 158 at least partially.

Furthermore, an inversion channel 161 is formed, which is between the first detection electrode 158 and the second detection electrode 159 but does not conductively join the first detection electrode 158 to the second detection electrode 159. The inversion channel 161 can in particular have a doping that is inverse to the other material of the second drive unit 150 in this region and is triggered by a field effect of a potential applied to the gate electrode 138.

The detection electrodes 158, 159 can in particular be part of the contacting electrodes and/or additionally provided electrodes.

Figure 5:
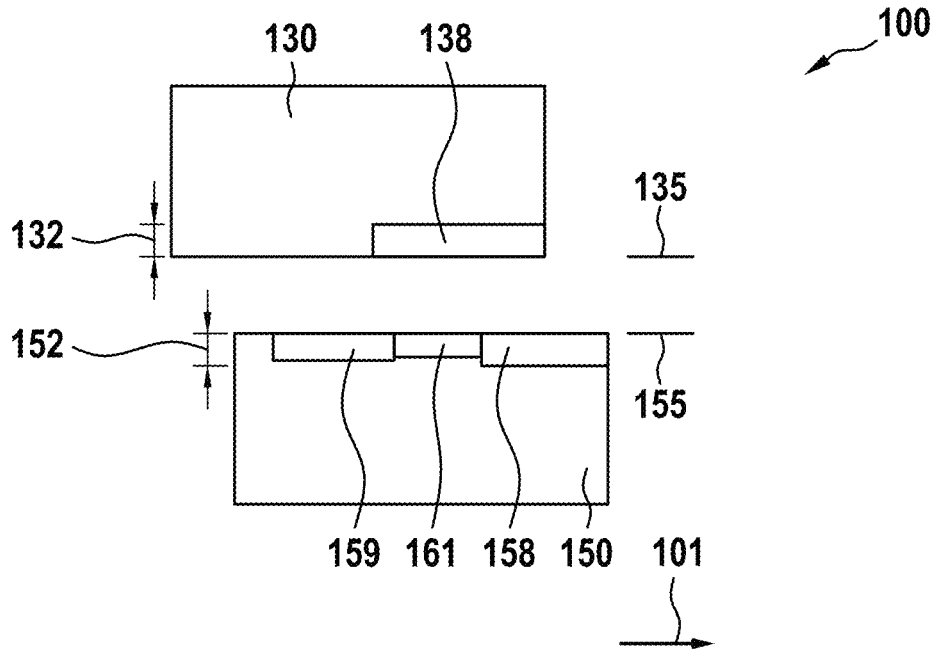
FIG. 5 shows a further cross section of the detail of the microelectromechanical actuator structure of FIG. 4 with the second drive unit deflected, according to an example embodiment of the present invention.

FIG. 5 shows the cross section of the detail of the microelectromechanical actuator structure 100 of FIG. 4 after the second drive unit 150 has been deflected in the first extension direction 101. As a result, the inversion channel 161 is extended and electrically conductively joins the first detection electrode 158 to the second detection electrode 159.

This creates a potential equalization between the detection electrodes 158, 159, which can then be evaluated. Thus, the deflection of the drive structure 120 can be determined.

Figure 6:
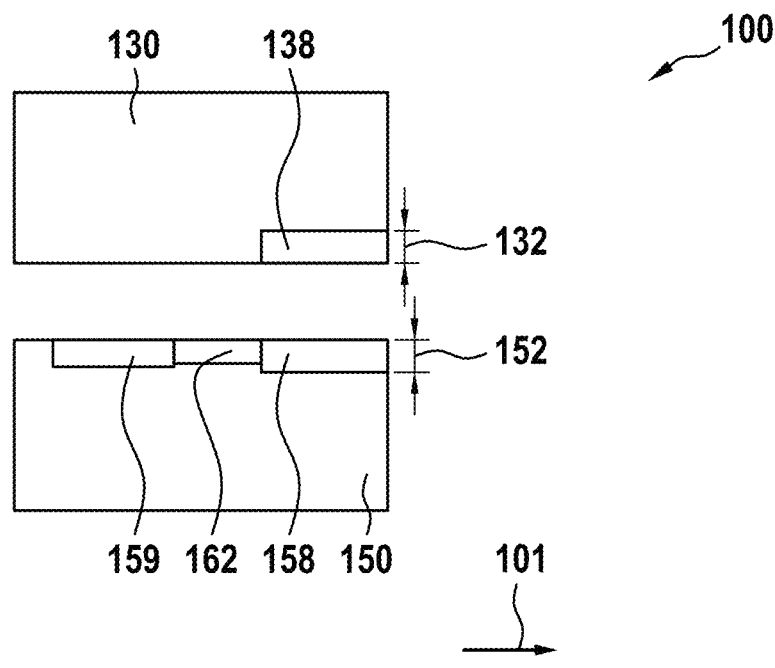
FIG. 6 shows a cross section of a detail of a further microelectromechanical actuator structure, according to an example embodiment of the present invention.

FIG. 6 shows a cross section of a detail of a further microelectromechanical actuator structure 100. The first electrode structure 132 comprises a gate electrode 138. A deflection of the drive structure 120 can be determined by means of the gate electrode 138. For this purpose, the second electrode structure 152, as also shown in FIG. 6, can comprise a first detection electrode 158 and a second detection electrode 159. The gate electrode 138 does not overlap the first detection electrode 158, in contrast to the embodiment of FIG. 4. Furthermore, a doped contact conductor track 162 is formed between the first detection electrode 158 and the second detection electrode 159 and conductively joins the first detection electrode 158 and the second detection electrode 159.

The detection electrodes 158, 159 can in particular be part of the contacting electrodes and/or additionally provided electrodes.

Figure 7:
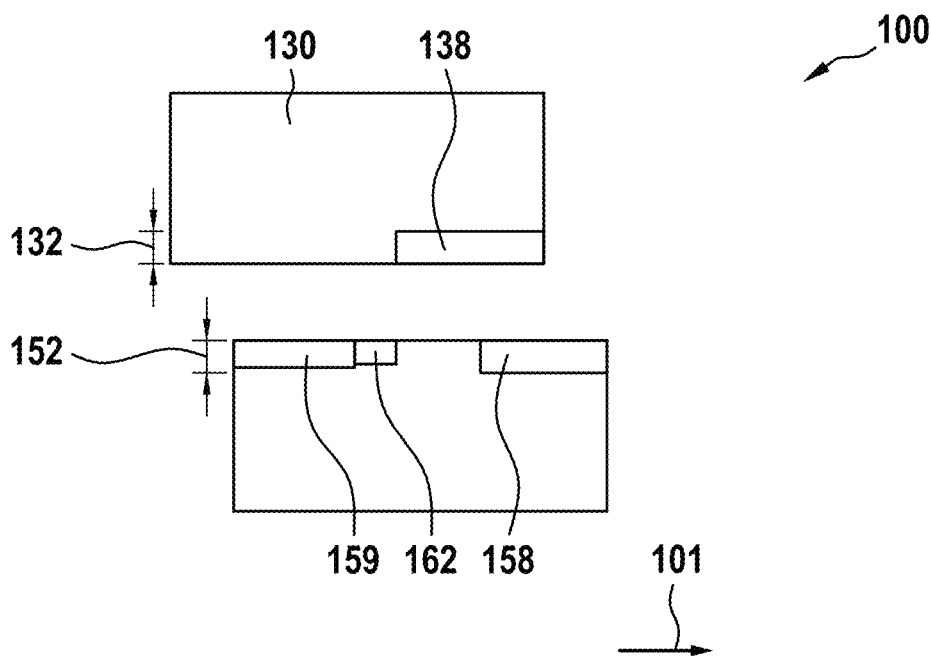
FIG. 7 shows a further cross section of the detail of the microelectromechanical drive structure of FIG. 6 with the second drive unit deflected, according to an example embodiment of the present invention.

FIG. 7 shows the cross section of the detail of the microelectromechanical actuator structure 100 of FIG. 6 after the second drive unit 150 has been deflected in the first extension direction 101. As a result, the gate electrode 138 and the doped contact conductor track 162 overlap. Due to a field effect, the doped contact conductor track 162 is now cut off and the detection electrodes 158, 159 are no longer conductively joined. This prevents a potential equalization between the detection electrodes 158, 159. This too can be read out or evaluated. Thus, the deflection of the drive structure 120 can be determined.

Both in the exemplary embodiment of FIGS. 4 and 5 and in the exemplary embodiment of FIGS. 6 and 7, the gate electrode 138 is alternatively arranged in the second electrode structure 152. The detection electrodes 158, 159 can then be arranged in the first electrode structure 132. A deflection of the drive structure 120 can therefore be determined by means of the gate electrode 138. As a result, the triggering of the electrodes 134, 154 can be controlled and/or regulated on the basis of the deflection.

Figure 8:
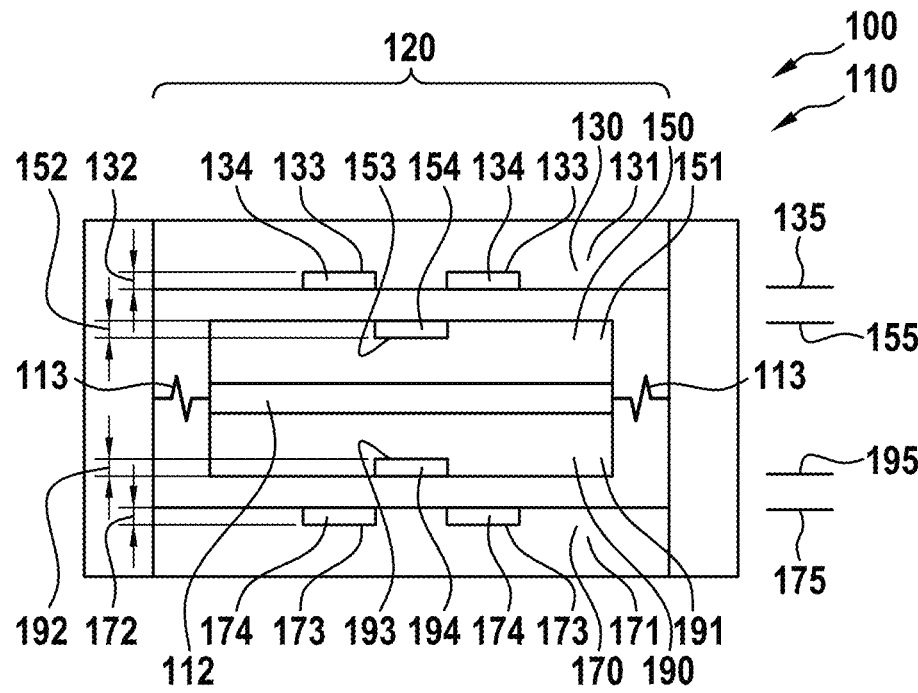
FIG. 8 shows a cross section of a further microelectromechanical actuator structure, according to an example embodiment of the present invention.

FIG. 8 shows a cross section of a microelectromechanical actuator structure 100 which corresponds to the microelectromechanical actuator structure 100 of FIG. 1, except where differences are described below. The drive structure 120 comprises a third drive unit 170 and a fourth drive unit 190. The third drive unit 170 comprises a third substrate 171 and a third electrode structure 172. The third substrate 171 has a third doping. The third electrode structure 173 has a doping inverse to the third doping, so that a third pn junction 173 is formed between the third substrate 171 and the third electrode structure 172. The fourth drive unit 190 comprises a fourth substrate 191 and a fourth electrode structure 192. The fourth substrate 191 has a fourth doping. The fourth electrode structure 192 has a doping inverse to the fourth doping, so that a fourth pn junction 193 is formed between the fourth substrate 191 and the fourth electrode structure 192. The third electrode structure 172 comprises at least two third electrodes 174. The fourth electrode structure 192 comprises at least a fourth electrode 194. The third electrodes 174 are arranged flat next to one another in a third electrode plane 175. The fourth electrode 194 is arranged flat in a fourth electrode plane 195. The third electrode plane 175 and the fourth electrode plane 195 are substantially parallel. The fourth substrate −191 is mechanically joined to the second substrate 151. The first substrate 131 is mechanically joined to the third substrate 171. The third drive unit 170 can therefore correspond in structure to the first drive unit 130. All other features of the first drive unit 130 can optionally also be provided for the third drive unit 170. The fourth drive unit 190 can therefore correspond in construction to the second drive unit 150. All other features of the second drive unit 150 can optionally also be provided for the fourth drive unit 190.

In particular, the third drive unit 170 can be constructed analogously to one of the embodiments of the first drive unit 130 shown in FIGS. 1 to 3. Furthermore, the fourth drive unit 190 can be developed into one of the embodiments of the second drive unit 150 shown in FIGS. 1 to 3. The functional element 112 can mechanically join the second drive unit 150 to the fourth drive unit 190, as shown in FIG. 8. The chip frame 111 can join the first drive unit 130 to the third drive unit 170, as also shown in FIG. 8. Furthermore, all electrode planes 135, 155, 175, 195 can be substantially parallel to one another, wherein there is a maximum angle between the electrode planes 135, 155, 175, 195 of 5 degrees.

Figure 9:
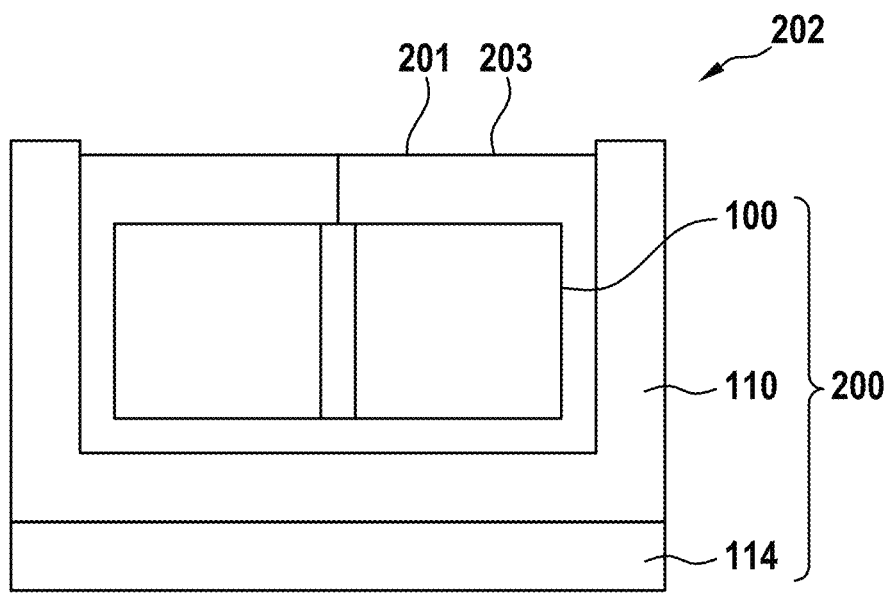
FIG. 9 shows a component, according to an example embodiment of the present invention.

FIG. 9 shows a component 200. The component 200 comprises one of the microelectromechanical actuator structures 100 described in FIGS. 1 to 8. The component 200 further comprises a useful element 201, wherein the useful element can be driven by the drive structure 120 of the microelectromechanical actuator structure 100.

In one exemplary embodiment of the microelectromechanical actuator structure 100, as shown in FIG. 9, it further comprises a control unit 114, which can be designed as an ASIC or as a further computing unit. The control unit 114 is configured to apply voltages to the electrodes 134, 154, 174, 194.

Alternatively, the control unit 114 is assigned to the component 200 and not to the microelectromechanical actuator structure 100. The control unit 114 can in particular be configured to apply the voltages described above and/or to carry out the deflection determination explained in connection with FIGS. 4 to 7.

The microelectromechanical actuator structure 100 enables the useful element 201 to be moved, in particular in parallel with the electrode planes.

In the exemplary embodiment of the component 200 shown in FIG. 9, the useful element 201 is a loudspeaker membrane 203, so that the component 200 is a loudspeaker 202. Alternatively, but not shown, the useful element 200 may be a pump piston or a valve membrane. The component 200 can then be a pump or a valve. Especially for loudspeakers, pumps or valves, the microelectromechanical actuator structure can be well used to provide microelectromechanical loudspeakers, pumps or valves.

Although the present invention has been described in detail by the preferred exemplary embodiments, the present invention is not limited to the disclosed examples and other variations may be derived therefrom by a person skilled in the art without departing from the scope of protection of the present invention.

What is claimed is:

1. A microelectromechanical actuator structure, comprising:

a microelectromechanical chip having a chip frame and a drive structure, the drive structure including a dopable material, wherein the drive structure includes a first drive unit and a second drive unit, the first drive unit includes a first substrate and a first electrode structure, wherein the first substrate has a first doping and wherein the first electrode structure has a doping inverse to the first doping, so that a pn junction is formed between the first substrate and the first electrode structure, wherein the second drive unit includes a second substrate and a second electrode structure, wherein the second substrate has a second doping and the second electrode structure has a doping inverse to the second doping, so that a pn junction is formed between the second substrate and the second electrode structure, wherein the first electrode structure includes at least two first electrodes, wherein the second electrode structure includes at least one second electrode, the first electrodes are arranged flat next to one another in a first electrode plane, wherein the second electrode is arranged flat in a second electrode plane, wherein the first electrode plane and the second electrode plane are substantially parallel to one another, wherein a movement of the second electrode structure relative to the first electrode structure in a direction of movement parallel to the electrode planes can be triggered by applying voltages to the first and second electrodes.

2. The microelectromechanical actuator structure according to claim 1, wherein a trench is arranged between the first electrodes.

3. The microelectromechanical actuator structure according to claim 1, wherein the first drive structure is immovable relative to the chip frame and wherein the second drive structure is joined to the chip frame via spring elements.

4. The microelectromechanical actuator structure according to claim 1, wherein the first substrate has a p-doping and the first electrode structure has an n-doping, and wherein the second substrate has a p-doping and the second electrode structure has an n-doping.

5. The microelectromechanical actuator structure according to claim 1, wherein the first drive structure includes a further first substrate, wherein the further first substrate is doped inversely to the first substrate.

6. The microelectromechanical actuator structure according to claim 5, wherein the first substrate and the further first substrate each form a layer of the first drive structure.

7. The microelectromechanical actuator structure according to claim 1, wherein the second electrode structure includes more than one second electrode, wherein an intermediate recess or a substrate region is arranged between the second electrodes, wherein a width of the intermediate recess or of the substrate region is greater than a width of the second electrodes.

8. The microelectromechanical actuator structure according to claim 1, wherein the drive structure includes a third drive unit and a fourth drive unit, wherein the third drive unit includes a third substrate and a third electrode structure, wherein the third substrate has a third doping and the third electrode structure has a doping inverse to the third doping, so that a pn junction is formed between the third substrate and the third electrode structure, wherein the fourth drive unit includes a fourth substrate and a fourth electrode structure, wherein the fourth substrate has a fourth doping and wherein the fourth electrode structure has a doping inverse to the fourth doping, so that a pn junction is formed between the fourth substrate and a fourth electrode structure, wherein the third electrode structure includes at least two third electrodes, wherein the fourth electrode structure includes at least one fourth electrode, wherein the third electrodes are arranged flat next to one another in a third electrode plane, wherein the fourth electrode is arranged flat in a fourth electrode plane, wherein the third electrode plane and the fourth electrode plane are substantially parallel to one another, wherein the fourth substrate is mechanically joined to the second substrate, and wherein the first substrate is mechanically joined to the third substrate.

9. The microelectromechanical actuator structure according to claim 1, wherein the first electrode structure and/or the second electrode structure includes a gate electrode, wherein a deflection of the drive structure can be determined using the gate electrode.

10. A component, comprising:

a microelectromechanical actuator structure including:

a microelectromechanical chip having a chip frame and a drive structure, the drive structure including a dopable material, wherein the drive structure includes a first drive unit and a second drive unit, the first drive unit includes a first substrate and a first electrode structure, wherein the first substrate has a first doping and wherein the first electrode structure has a doping inverse to the first doping, so that a pn junction is formed between the first substrate and the first electrode structure, wherein the second drive unit includes a second substrate and a second electrode structure, wherein the second substrate has a second doping and the second electrode structure has a doping inverse to the second doping, so that a pn junction is formed between the second substrate and the second electrode structure, wherein the first electrode structure includes at least two first electrodes, wherein the second electrode structure includes at least one second electrode, the first electrodes are arranged flat next to one another in a first electrode plane, wherein the second electrode is arranged flat in a second electrode plane, wherein the first electrode plane and the second electrode plane are substantially parallel to one another, wherein a movement of the second electrode structure relative to the first electrode structure in a direction of movement parallel to the electrode planes can be triggered by applying voltages to the first and second electrodes; and a useful element, wherein the useful element can be driven using the drive structure.

* * * * *